(12) United States Patent
Tages et al.

(10) Patent No.: US 8,774,882 B2
(45) Date of Patent: Jul. 8, 2014

(54) MOBILE DEVICE CASE WITH REMOVABLY INSERTABLE CORNERS

(75) Inventors: Fernando Tages, Coral Springs, FL (US); Harold Scot Goradesky, Davie, FL (US); Erik Turocy, Columbus, OH (US)

(73) Assignee: A.G. Findings & Mfg. Co., Sunrise, FL (US)

( * ) Notice: Subject to any disclaimer, the term of this patent is extended or adjusted under 35 U.S.C. 154(b) by 0 days.

(21) Appl. No.: 13/491,694

(22) Filed: Jun. 8, 2012

(65) Prior Publication Data
US 2013/0331155 A1  Dec. 12, 2013

(51) Int. Cl.
*H04W 88/02* (2009.01)

(52) U.S. Cl.
USPC .................. 455/575.8; 455/90.3; D14/250

(58) Field of Classification Search
USPC ............... 455/550.1, 575.1, 575.8, 90.3, 347, 455/351; 206/305, 320; D14/25–253, 341
See application file for complete search history.

(56) References Cited

U.S. PATENT DOCUMENTS

| | | |
|---|---|---|
| 2,004 A | 3/1841 | Harris et al. |
| 89,570 A | 5/1869 | Fellows |
| 4,006,764 A | 2/1977 | Yamamoto et al. |
| 4,584,718 A | 4/1986 | Fuller |
| 4,703,161 A | 10/1987 | McLean |
| 5,025,921 A | 6/1991 | Gasparaitis et al. |
| 5,175,873 A | 12/1992 | Goldenberg et al. |
| 5,386,084 A | 1/1995 | Risko |
| 5,586,002 A | 12/1996 | Notarianni |
| 5,713,466 A | 2/1998 | Tajima |
| 5,812,188 A | 9/1998 | Adair |
| 5,990,874 A | 11/1999 | Tsumura et al. |
| 5,996,790 A | 12/1999 | Yamada et al. |
| 6,031,524 A | 2/2000 | Kunert |
| 6,052,279 A | 4/2000 | Friend et al. |
| 6,138,826 A | 10/2000 | Kanamori et al. |
| 6,317,313 B1 | 11/2001 | Mosgrove et al. |
| 6,349,824 B1 | 2/2002 | Yamada |
| 6,415,138 B2 | 7/2002 | Sirola et al. |
| 6,426,870 B1 | 7/2002 | Oross et al. |
| 6,525,928 B1 | 2/2003 | Madsen et al. |
| 6,532,152 B1 | 3/2003 | White et al. |
| 6,536,589 B2 | 3/2003 | Chang |
| 6,608,119 B2 | 8/2003 | Tanabe et al. |
| 6,646,864 B2 | 11/2003 | Richardson |
| 6,646,866 B2 | 11/2003 | Kao |
| 6,659,274 B2 | 12/2003 | Enners |
| 6,721,651 B1 | 4/2004 | Minelli |
| 6,785,566 B1 | 8/2004 | Irizarry |
| 6,844,845 B1 | 1/2005 | Whiteside et al. |
| 6,896,134 B2 | 5/2005 | Russell et al. |
| 6,983,130 B2 | 1/2006 | Chien et al. |
| 6,995,976 B2 | 2/2006 | Richardson |
| 7,069,063 B2 | 6/2006 | Halkosaari et al. |
| 7,130,185 B2 | 10/2006 | Chen et al. |
| 7,158,376 B2 | 1/2007 | Richardson et al. |
| 7,180,735 B2 | 2/2007 | Thomas et al. |
| 7,230,823 B2 | 6/2007 | Richardson et al. |
| 7,312,984 B2 | 12/2007 | Richardson et al. |
| 7,447,532 B2 * | 11/2008 | Hsu ........................... 455/575.8 |

(Continued)

*Primary Examiner* — Thanh Le
(74) *Attorney, Agent, or Firm* — Christopher & Weisberg, P.A.

(57) ABSTRACT

A mobile device case including a housing sized to receive a mobile device. The housing includes at least one corner defining an aperture there through. A corner element is included and is removeably insertable within the aperture.

18 Claims, 5 Drawing Sheets

(56) References Cited

U.S. PATENT DOCUMENTS

| | | |
|---|---|---|
| 7,609,512 B2 | 10/2009 | Richardson et al. |
| D615,535 S | 5/2010 | Richardson et al. |
| 7,907,394 B2 | 3/2011 | Richardson et al. |
| D641,354 S * | 7/2011 | Hsu .............................. D14/341 |
| 8,204,561 B2 * | 6/2012 | Mongan et al. ............. 455/575.8 |
| D674,791 S * | 1/2013 | Melanson et al. ........... D14/250 |
| D675,604 S * | 2/2013 | Limber et al. ............... D14/250 |
| 8,403,136 B1 * | 3/2013 | Tsai .............................. 206/320 |
| 2002/0137475 A1 | 9/2002 | Shou et al. |
| 2003/0217940 A1 | 11/2003 | Russell et al. |
| 2004/0089570 A1 | 5/2004 | Chien et al. |
| 2005/0139498 A1 | 6/2005 | Goros |
| 2010/0008028 A1 | 1/2010 | Richardson et al. |
| 2010/0104814 A1 * | 4/2010 | Richardson et al. .......... 428/156 |
| 2011/0226545 A1 | 9/2011 | Richardson et al. |
| 2011/0228458 A1 | 9/2011 | Richardson et al. |
| 2011/0228459 A1 | 9/2011 | Richardson et al. |

* cited by examiner

Section A-A

Section A-A

MOBILE DEVICE CASE WITH REMOVABLY INSERTABLE CORNERS

CROSS-REFERENCE TO RELATED APPLICATION n/a

STATEMENT REGARDING FEDERALLY SPONSORED RESEARCH OR DEVELOPMENT n/a

FIELD

Mobile device cases, and more particularly, to a protective mobile device case having removably insertable corner elements.

BACKGROUND

As mobile phones and other mobile electronic devices become more technologically advanced and include more features, the cost to purchase these mobile devices increases, as does the cost to replace them should they break. To prophylactically protect such devices from damage or breakage, protective cases have been devised to reduce the risk that a mobile device breaks should it be dropped or otherwise exposed to an impact force.

In particular, materials such as polycarbonate, thermoplastic polyurethane, and silicone are common materials found in mobile device cases. These materials are either molded or otherwise incorporated into the mobile device case to either provide stability to the case, or to cushion the mobile device within the case during an impact event. Independent of which materials comprise a mobile device case, the amount of impact protection afforded by a housing that retains the mobile device remains constant. Short of surrounding the entire housing with an additional layer of material, such as silicone, which makes any case heavier and bulkier, the user cannot customize the amount of impact protection a particular case provides, without significantly changing the appearance, weight, and size of the case.

Indeed, depending on the circumstances, the user of a mobile device case may desire greater or lesser impact protection. For example, a user of the case may want greater impact protection while rock climbing and lesser impact protection during everyday use. Current mobile device cases, however, fail to provide any amount of customizable impact protection that does not dramatically change the appearance of the case and/or requires the user to carry large materials sized to fit over a particular case.

SUMMARY OF THE INVENTION

In accordance with one embodiment, a mobile device case and a method of protecting a mobile device is provided. The mobile device case includes a housing sized to receive a mobile device. The housing includes at least one corner defining an aperture there through. A corner element is included and is removeably insertable within the aperture.

In another embodiment, the mobile device case includes a unitary housing defining an interior, the interior is sized to receive a mobile device. The housing includes at least one corner defining an aperture, the corner defines a circumferential edge around the aperture. A corner element removeably insertable within the aperture is included, the corner element defines a recess sized to engage the edge. A first portion of the corner element is at least substantially co-planar with an outer surface of the corner, and a second portion of the corner element is disposed within the interior of the housing.

In yet another embodiment, the mobile device case includes a housing defining an interior, the interior is sized to receive a mobile device. The housing includes four corners, and each corner defines an aperture and a circumferential edge around the aperture. Four corner elements are included, and each corner element is removeably insertable within each aperture and defines a recess sized to receive the edge. A durometer of each corner element is less than a durometer of the housing. When the corner elements are inserted within the apertures, a first portion of each corner element is visible, and a second portion of each corner element is concealed within the interior of the housing, and the edge of each corner surrounds the first portion.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
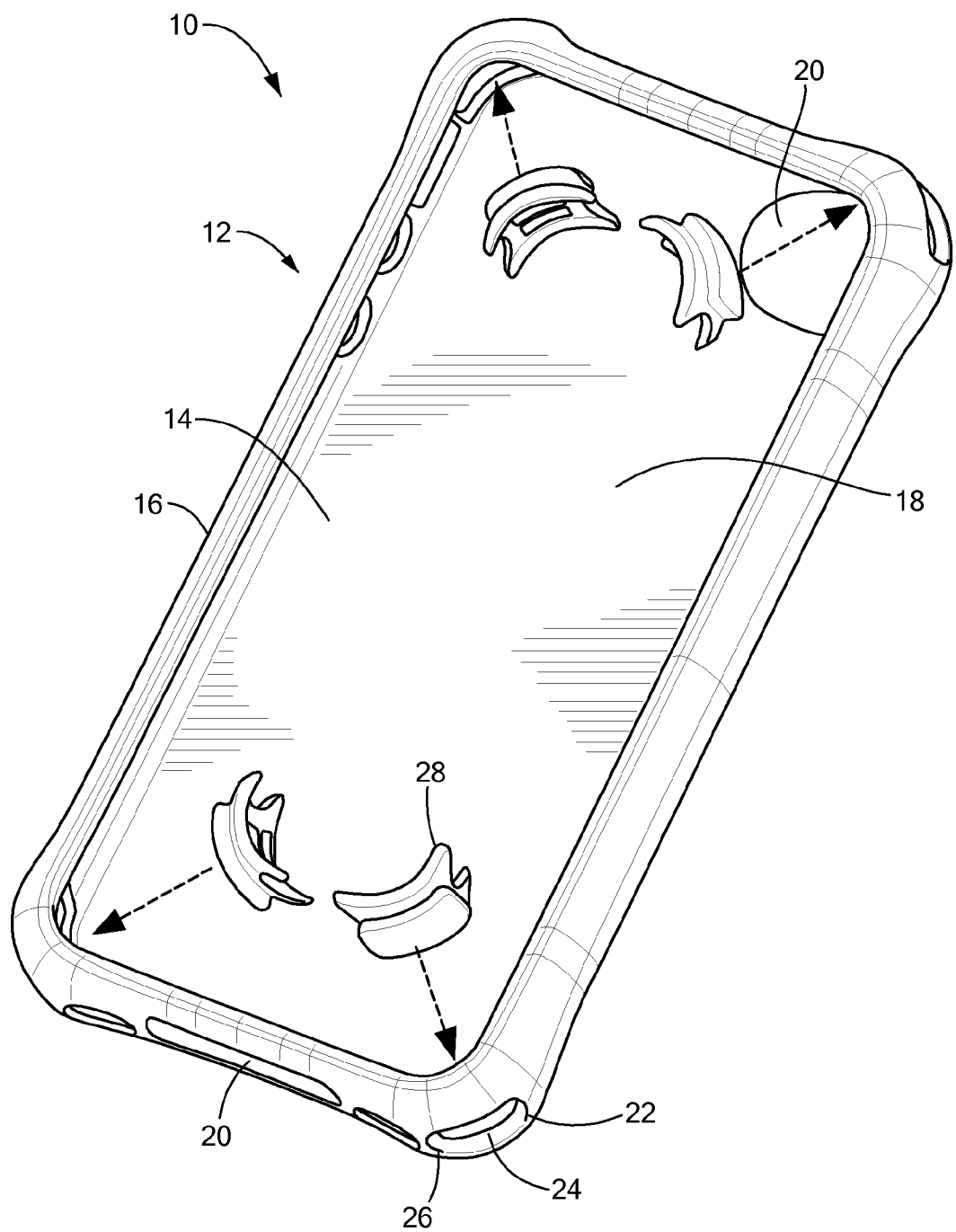
FIG. 1 is a top perspective view of a mobile device case constructed in accordance with the principles of the present invention.

Now referring to the drawings in which like reference designators refer to like elements, there is shown in FIG. 1 a mobile device case constructed in accordance with the principles of the present invention and designated generally as "10." The mobile device case 10 may include a housing 12 sized to receive and retain a mobile device. In particular, the housing 12 may be sized to contour a particular mobile device, such that the mobile device is securely retainable within the housing 12. In an exemplary embodiment the housing 12 is a single-piece unitary structure, but it is further contemplated that the housing 12 may be a two-piece or a clam-shell type housing 12, with one or more portions connecting together to define the housing 12. The housing 12 may be composed of, or otherwise include, elastic materials such as thermoplastic polyurethane (TPU), or substantially inelastic materials, such a polycarbonate (PC), or combinations thereof molded or otherwise included in the housing 12. In an exemplary configuration, the housing 12 is entirely composed of a TPU and is sufficiently flexible to stretch to accommodate the corresponding mobile device.

The housing 12 may include a back portion 14 arranged to contour a back portion of the mobile device, and multiple side portions 16 affixed to the back portion 14 and arranged to surround corresponding side portions of the mobile device. The back portion 14 and the side portions 16 may be molded as a contiguous unit. The side portions 16 may further define protuberances that are sized to receive one or more controls of the mobile device, for example, volume controls. In particular, the volume controls may be actuable by pressing the protuberances to contact the volume controls. The housing 12 may further define an opening 18 sized to facilitate the insertion and removal of the mobile device case from the housing 12 in addition to providing access to a touch screen on the mobile device. The housing 12 may further define one or more ports 20 along the side portion 18, the ports 20 allowing access to a one or more controls or feature of the mobile device, such as a power port, speaker, headphone jacks, and the like. The back portion 14 may also define one of the ports 20 to provide an opening for a camera on the rear of the mobile device.

The housing 12 may further include one or more corners 22. In an exemplary configuration, the housing 12 includes four corners 22 sized to receive, for example, the four corners of a substantially rectangular IPHONE 4/4S, or any mobile device with corners. The corners 22 may be thicker than the surrounding side portions 16 to provide greater protection if the housing 12 is dropped and receives and impact force. For example, each corner 22 may be bulbous in that it protrudes a distance away and above from the side portions 16 such that the corners 22 impact a surface before any other portion housing 12 during an impact event. In particular, the corners 22 may be rounded, curved, or straight edged, and may join adjacent side portions 16. The side portions 16 may increase in thickness on both on an anterior and posterior portion of the side portions 16 as two side portions 16 merge to form a corner 22.

Each corner 22 may define an aperture 24. In particular, each corner 22 may define a substantially circumferential aperture 24 providing access to the interior of the housing 12. The aperture 24 may define any shape or size, and in particular, may define substantially ovular, circular, rectangular, or any other shape. The size of the aperture 24 may vary depending on the size of the corner 22 or may should the size of the corners 22 remain the constant. For example, in some configurations, the corners 22 may be more bulbous than in others to provide for enhanced impact protection. In such embodiments, the aperture 24 may be larger, or alternatively, remain the substantially the same size when compared to embodiments in which the corners 22 are less bulbous. In a particular configuration, each corner 22 may define its respective aperture 24 at substantially a 45 degree angle with respect to a longitudinal axis defined by each side portion 16. In such a configuration, each aperture 24 is defined at substantially the widest portions of the housing 12. Each corner 22 may further define a substantially circumferential edge 26 surrounding each aperture 24. The edge 26 may be substantially flat, or may alternatively define a thickness such that it is resistant to deflection during an impact event. For example, the edge 26 may be tapered in part, such that it narrows in thickness as it extends toward the center of the aperture 24.

Continuing to refer to FIG. 1, one or more corner elements 28 may be included. The corner elements 28 are sized to be removeably inserted and securable within the aperture 24 of the corners 22. In particular, each corner 22 may removeably receive and retain at least one corner element 28 within the corresponding aperture 24. In the embodiment shown in FIG. 1, one corner element 28 is inserted within each of the four corners 22. Each corner element 28 may be commensurate in shape and size to every other corner element 28, such that when inserted within each respective aperture 24, the housing 12 is substantially symmetric on all sides. Optionally, the corner elements 28 may be differently sized, have different colors, and/or have other ornamental or source identifying features. The corner elements 28 may further be composed of materials having a different durometer than that of the housing 12. For example, as discussed above the housing 12 may be composed of materials, such as TPU or PC. The corner elements 28 may be composed of materials, such as silicone or TPU, having a lower durometer than that of housing 12. As such, the corner elements 28 may be more flexible and resilient compared to the surrounding corners 22.

The flexibility of the corner elements 28 relative to the corners 22 may provide additional cushion to the corners of the mobile device during an impact event. In particular, because the corner elements 28 are releaseably affixed with the aperture 24, which may be at the widest portion of the housing 12, the corner elements 28 may contact a surface before any other part of the housing 12. That is, the corner elements 28 may absorb part of the impact force before the remainder of the impact force is transferred to the corners 22 and to the housing 12. This configuration may provide for additional impact protection when compared to a mobile device case being uniformly composed of the same materials, which may transfer an impact force directly to a mobile device.

Continuing to refer to FIG. 1, the corner elements 28 may be inserted within the aperture 24 from the interior of the housing 12 by pressing the corner elements 28 within the aperture 24 as illustrated by the arrows in FIG. 1. It is further contemplated that the corner elements 28 may be inserted within the aperture 24 from outside of the housing 12 by pressing and squeezing the corner elements 28 within the aperture 24 from the exterior of the housing 12. The corner elements 28 further define a radius of curvature that is substantially similar to the radius of curvature of the corners 22. In particular, the radius of curvature of the corners 22 may be pre-fabricated to substantially contour the corners of the mobile device for which the housing 12 is fabricated to receive. The corner elements 28 may substantially match the curvature of the corners 22 such that the mobile device fits within the housing 12 in the same manner whether the corner elements 28 are inserted or whether they are removed.

Figure 2:
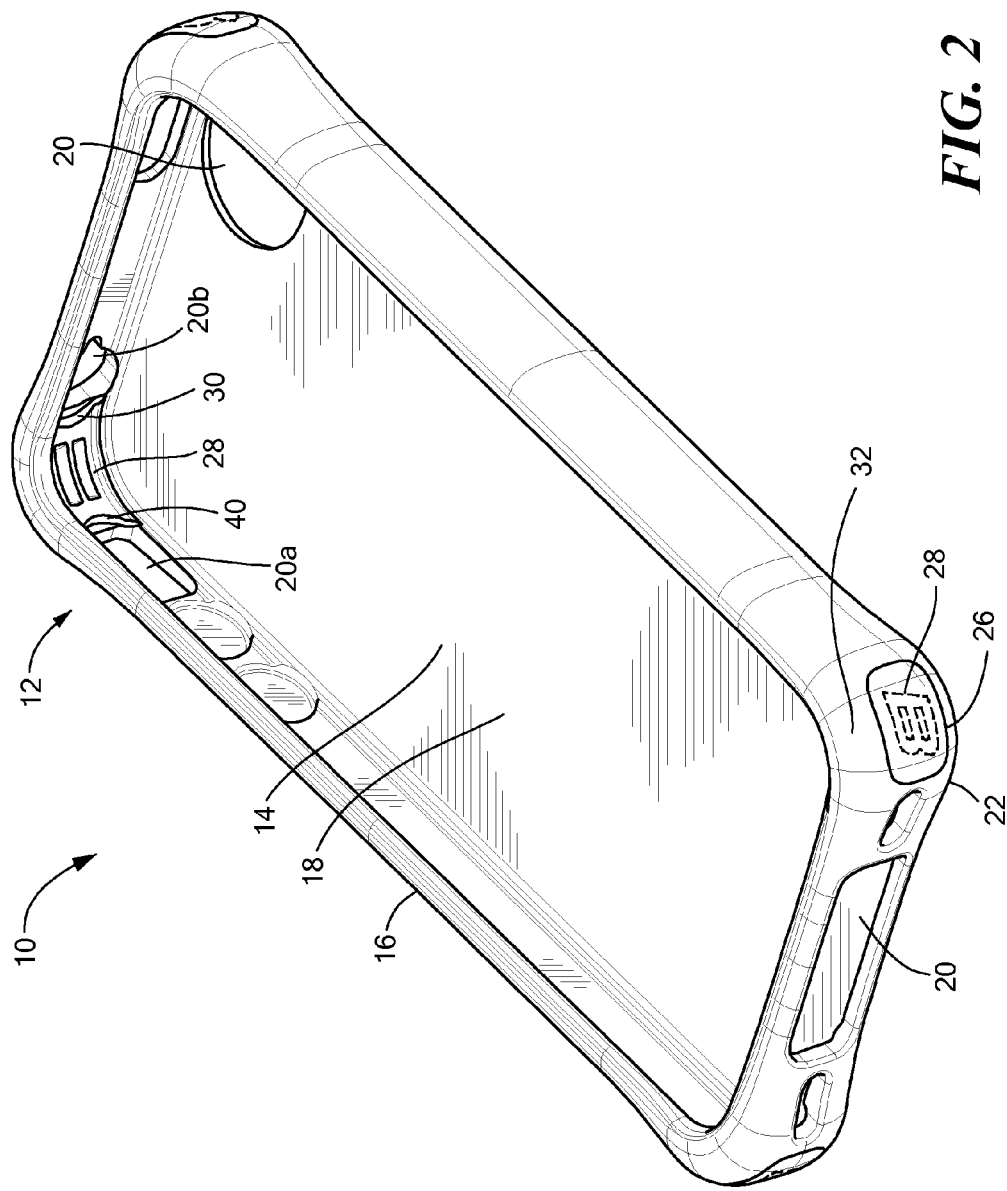
FIG. 2 is a top perspective view of the mobile device case of FIG. 1 with the corner elements inserted with the case.

Referring now to FIG. 2, when the corners elements 28 are inserted within the aperture 24 of corners 22, the outer surface of each corner element 28 may be substantially co-planar and flush with exterior surface of the housing 12. In particular, each corner 22 may define an inner surface 30 and outer surface 32. When inserted within the aperture 24, a portion of the corner element 28 is pressed against the inner surface 30 of the corner 22. Another portion of the corner element 28 may be sized to fit within the aperture 24 such that it is substantially co-planar and flush with the outer surface 32 of the corner 22 to provide a smooth profile to the housing 12.

Figure 3:
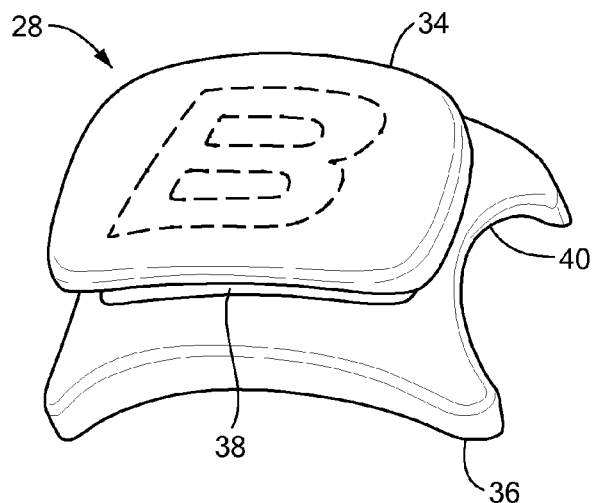
FIG. 3 is a top perspective view of an exemplary corner element shown in FIG. 1.

Referring now to FIG. 3, the corner element 28 may include a first portion 34 adjoined and superjacent to a second portion 36. The first portion 34 and the second portion 36 may be composed of materials having the same durometer, or alternatively, may have different durometers. For example, the first portion 34 may be composed of a material have a lower durometer, for example, silicone or TPU, or a combination thereof, and the second portion 36 may be composed of a material with a higher durometer, for example, TPU, PC, or a combination thereof. In an exemplary embodiment, both the first portion 34 and the second portion 36 are composed of the same durometer TPU.

The first portion 34 may be substantially rectangular in shape with rounded corners, or may alternatively, define any shape or size with any configuration of corners. In an exemplary embodiment, the first portion 34 defines an arcuate shape having a curvature that is the same or substantially the same as the curvature of the outer surface 32 of the corners 22. In such a configuration, when the corner element 28 is inserted within the aperture 24, the outer surface of the first portion 34 is substantially co-planar with the outer surface 32 of the corner 22, and the second portion 34 is pressed against the inner surface 30 of the corner 22. The width of the first portion 34 may be substantially the same as the width of the widest portion of the aperture 24. In particular, because the edge 26 of the corner 22 may taper in thickness as it extends toward the center of the aperture 24, the width of the aperture 24 may be larger proximate the outer surface 32 of the corner 22 compared to the width of the aperture 24 proximate the inner surface 30 of the corner 22.

The corner 22 may define a recess 38 between the first portion 34 and the second portion 36. In an exemplary embodiment, the recess 38 is circumferential in that the recess 38 is defined around the perimeter of the first portion 34. In other embodiments, the recess 38 may be a notch, detent, or other shapes and sizes defined about or by a portion of the first portion 34 or the second portion 36. The recess 38 may be sized to receive a portion of the edge 26 such that the corner element 28 may be removeably affixed to the corner 22.

Figure 4:
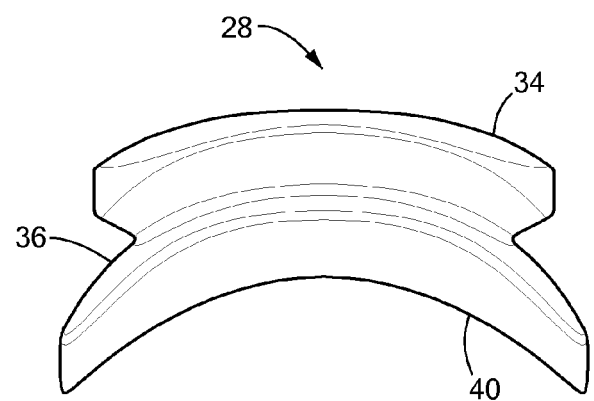
FIG. 4 is a side vide of the corner element shown in FIG. 3.

Now referring to FIG. 4, the second portion 36 of the corner element 28 may be molded subjacent to the first portion 34 or may be connected to the first portion 34 by a post or some other structure. The second portion 36 may define a larger surface area compared to the first portion 34. In particular, the second portion 36 may extend a distance away from the first portion 34, in all directions, and may also define the same general shape to that of the first portion 34. For example, as shown in FIG. 4, the second portion 36 may define a curvature substantially similar to the curvature of the first portion 34. The second portion 36 may also include plurality of side segments 40. The side segments 40 may each define a substantially concave indentation along their lengths. This crescent shape may provide access to one or more controls of the mobile device that may be positioned proximate the corners 22 when the corner element 28 is inserted within the aperture 24 and the second portion 36 is pressed against the inner surface 30 of the corner. For example, the IPHONE 4/4S includes a selector switch to turn on/off the ringer of the mobile device and a headphone port positioned on opposite sides of the top left corner 22. The ports 20 on the housing 12 for these controls are shown in FIG. 2 and marked 20a and 20b respectively. The crescent shape of the side segments 40 allows the corner element 28 to be inserted within the aperture 24 without obstructing the ports 20a and 20b. It is further contemplated the shape of the side segments 40 of the second portion 36 may be variable depending the mobile device to be inserted within the housing 12.

Figure 5:
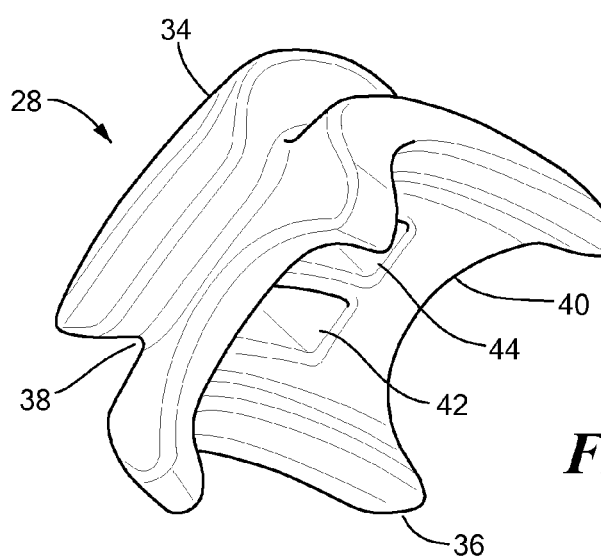
FIG. 5 is a bottom perspective view of the corner element shown in FIG. 3.

Referring now to FIG. 5, the second portion 36 may define a deformation region 42 on its bottom face. The deformation region 42 may include one or more deformation gaps 44 defined by the second portion 36. The deformation region 42 may be a region of the second portion 36 that contacts the corner of the mobile device during impact, and is the point at which an impact force is largely absorbed and therefore prevented from being transferred to the mobile device. The deformation gaps 44 of the deformation region 42 may provide an air space between the corner of the mobile device and the second portion 36, such that the only a portion of the second portion 36 contacts the mobile device during an impact event. In an exemplary configuration, two deformation gaps 44 are defined within the deformation region 42 and are spaced from each other by a septum or a portion of the second portion 36. The deformation gaps 44 increase the compressibility of the second portion 36 contacting the corner of the mobile device, and thus reduces the impact force transferred to the mobile device.

In an exemplary installation, the corner element 28 may be removeably affixed to the corner 22 by pressing on the second portion 36 and pushing the corner element 28 into the aperture 24, such that the circumferential edge 26 of the corner 22 is inserted within the recess 38. Because the first portion 34 has a larger width than the portion of the aperture 24 proximate the inner surface 30 of the corner 22, the first portion 34 may be flexed as it is pushed into the aperture 24. As the first portion 34 traverses the aperture 24 toward the outer surface 32, the width of the aperture 24 increases such that the aperture 24 is substantially the same width as the first portion 34. Additionally, as the first portion 34 settles within the aperture 24, the edge 26 is forced into the recess 38 such that the corner element 28 is secured to the corner 22. The resulting disposition of the corner element 28 with respect to the corner 22 provides that the second portion 36 may be pressed up against the inner surface 30 of the corner 22, and a portion of the first portion 34 is disposed above the edge 26. When the mobile device is inserted within the housing and the corner elements 28 are inserted, the second portion 36 may be concealed within the housing 12, while the first portion 34 is visible. To remove the corner element 28 from the aperture, the first portion 34 may be pushed into the aperture 24 and flexed such that it is forced out through the aperture.

Figure 6:
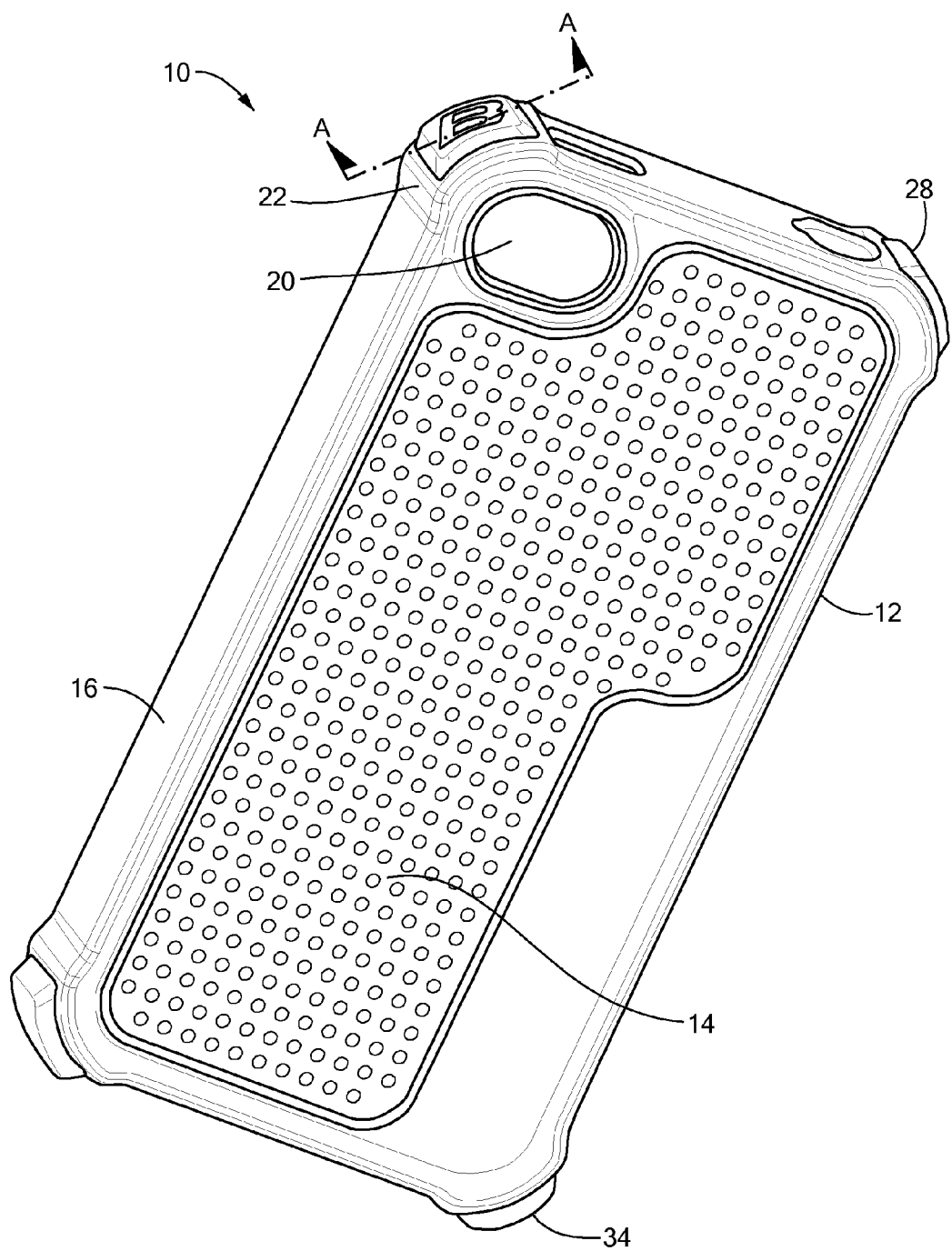
FIG. 6 is a top perspective view of another mobile device case constructed in accordance with the principles of the present invention.
Figure 7:
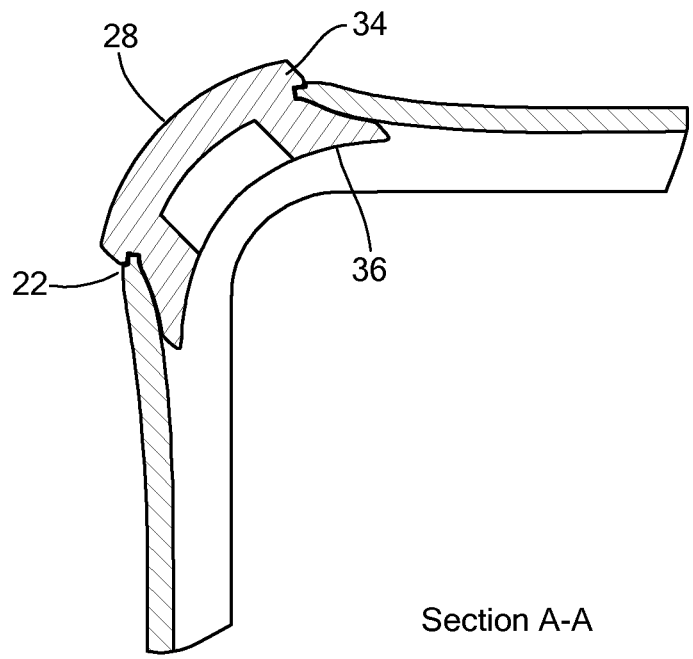
FIG. 7 is a cross-sectional view through Section A-A in FIG. 6.
Figure 8:
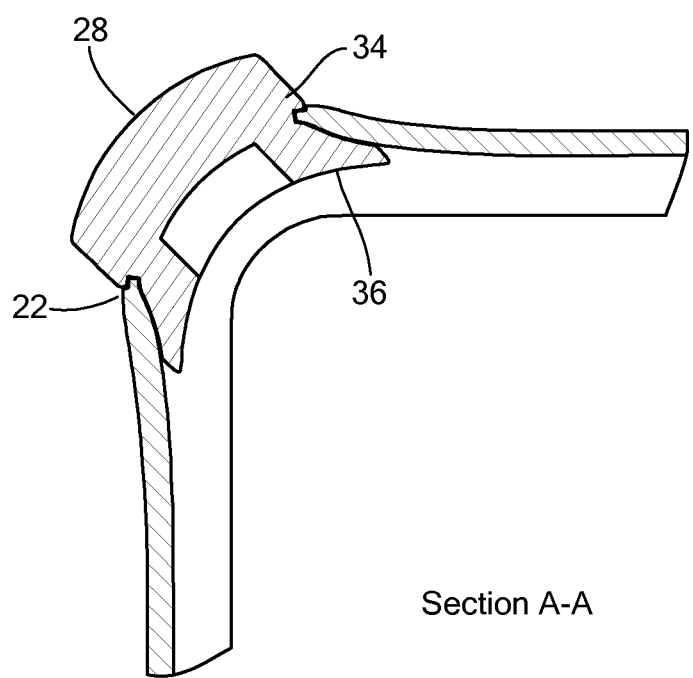
FIG. 8 is a cross-sectional view through Section A-A in FIG. 6 with a larger corner element inserted within the corner.

Now referring to FIG. 6, in another embodiment, the corner elements 28 may be constructed such that the first portion 34 protrudes a distances away from the corners 22 to provide for additional impact protection. For example, the first portion 34 may define a larger thickness and protrude a distance away from the corners 22 when installed within the corners 22 compared the embodiment shown in FIG. 2. It is further contemplated that the corner elements 28 shown in FIGS. 1-5 and the corner elements 28 shown in FIG. 6, may each fit within the aperture 24 shown in FIGS. 1-5 or in the embodiment shown in FIG. 6. As such, corner elements 28 having first portions 34 with different heights may be mixed and matched within the apertures 24 of the embodiments shown in FIG. 2 and/or FIG. 6 depending on the needs of the user of the case 10. For example, a user requiring an increased level of impact protection may insert corner elements 28 having a larger thickness because in such embodiments, the corner elements 28 may absorb a greater amount of the impact force compared to embodiments in which the corner elements 28 have smaller heights. Thus, the amount of impact protection may be customizable depending on the size of the corner elements 28. For example, as shown in FIGS. 7 and 8, the size of the first portion 34 may be variable and selectable, as discussed above, to provide for customizable impact protection, while the second portion 36 may be substantially the same size such that differently sized corner elements 28 may be inserted within the same sized corner 22. For example, as shown in FIG. 7, the first portion 34 protrudes a predetermined distance away from the corner 22 whereas in FIG. 8 the first portion 34 is larger than the first portion 34 of FIG. 7 and protrudes further away from the corner 22 than in FIG. 7.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A mobile device case, comprising:
   a housing sized to receive a mobile device, the housing including at least one corner defining an aperture there through, an outer surface, and an inner surface;
   a corner element removeably insertable within the aperture; the corner element having an outer surface; and
   when the corner element is inserted within the aperture, the outer surface of the corner element is substantially co-planar with the outer surface of the corner.

2. The mobile device case of claim 1, wherein the housing has a first durometer and the corner element has a second durometer, and wherein the first durometer and the second durometer are different.

3. The mobile device case of claim 2, wherein the second durometer is less than the first durometer.

4. The mobile device case of claim 1, wherein the housing includes four corners, each corner engaging a corner element.

5. The mobile device case of claim 1, wherein the corner element has a first portion and a second portion, and wherein the corner element defines a recess between the first portion and the second portion.

6. The mobile device case of claim 5, wherein when the corner element is inserted with the aperture, the second portion of the corner element is pressed against the inner surface of the corner.

7. The mobile device case of claim 5, wherein the second portion defines at least one deformation region.

8. The mobile device case of claim 5, wherein when the mobile device is disposed within the housing, the first portion is visible and the second portion is concealed.

9. The mobile device case of claim 5, when the corner defines an edge surrounding the aperture, and wherein when the corner element is disposed within the housing, the edge substantially surrounds the first portion.

10. A mobile device case, comprising:
    a unitary housing defining an interior, the interior being sized to receive a mobile device,
    the housing including at least one corner defining an aperture and a circumferential edge around the aperture, the corner having an outer surface;
    a corner element removeably insertable within the aperture, the corner element defining a recess sized to engage the circumferential edge; and
    a first portion of the corner element being at least substantially co-planar with the outer surface of the corner, and a second portion of the corner element being disposed within the interior of the housing.

11. The mobile device case of claim 10, wherein the housing defines a first durometer and the corner element defines a second durometer, and wherein the first durometer and the second durometer are different.

12. The mobile device case of claim 11, wherein the second durometer is less than the first durometer.

13. The mobile device case of claim 10, wherein the housing includes four corners, each corner engaging a corner element.

14. The mobile device case of claim 10, wherein the second portion of the corner element defines a deformation region.

15. The mobile device case of claim 14, wherein when the mobile device is disposed within the housing, the mobile device contacts the deformation region during an impact event.

16. The mobile device case of claim 10, wherein the corner defines outer surface and an inner surface, and wherein when the corner element is inserted with the aperture, an outer surface of the second portion of the corner element is pressed against the inner surface of the corner.

17. The mobile device case of claim 10, wherein when the mobile device is disposed within the housing, the first portion is visible and the second portion is concealed.

18. A mobile device case, comprising:
    a housing defining an interior, the interior being sized to receive a mobile device,
    the housing including four corners, each corner defining an aperture and including a circumferential edge around the aperture;
    four corner elements, each corner element removeably insertable within each aperture and defining a recess sized to receive the circumferential edge;
    a durometer of each corner element being less than a durometer of the housing; and
    when the corner elements are inserted within the apertures:
    a first portion of each corner element is visible, and a second portion of each corner element is concealed within the interior of the housing; and the circumferential edge of each corner surrounds the first portion.

* * * * *